S. FRAZER.
Distilling Oil from Resin.
No. 28,663. Patented June 12, 1860.
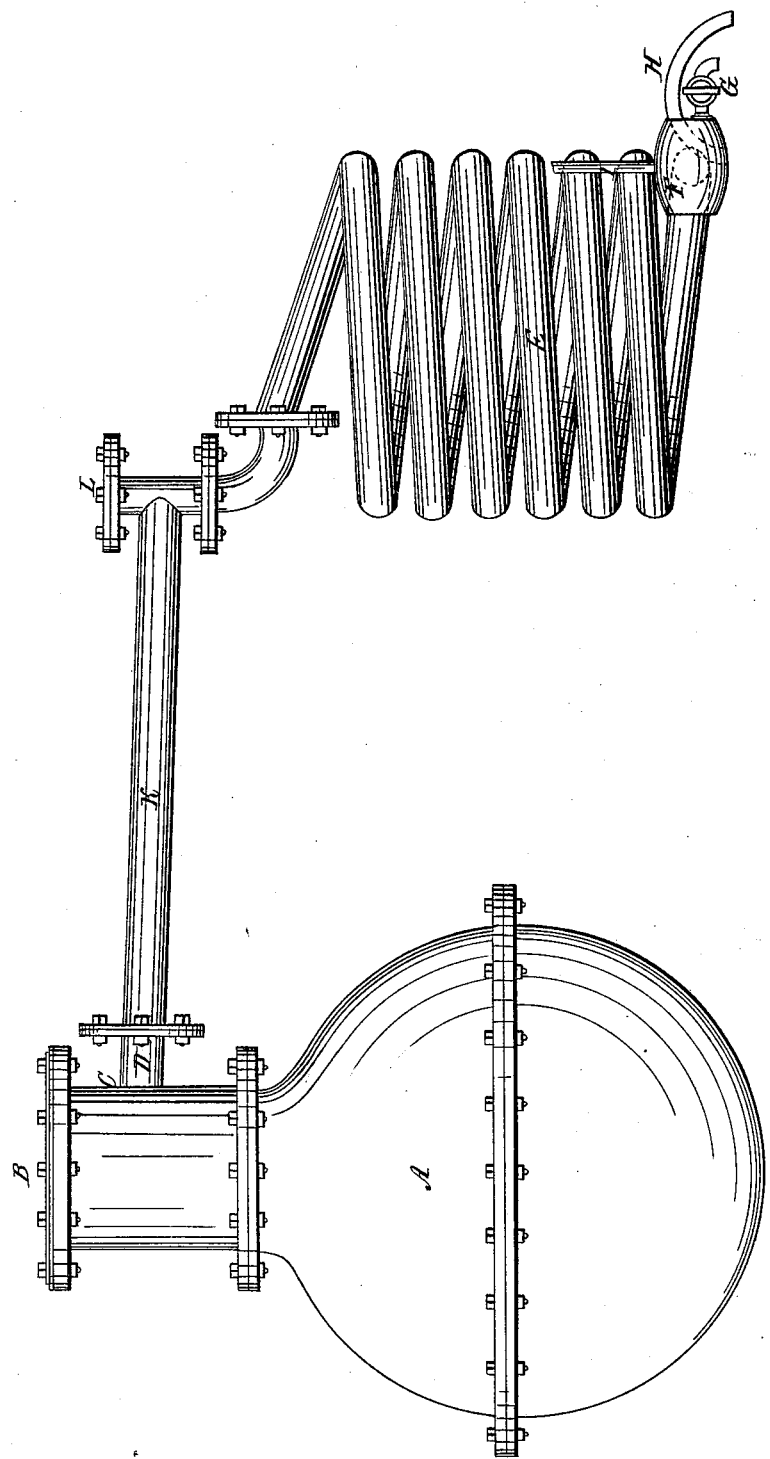

UNITED STATES PATENT OFFICE.

SAMUEL FRAZER, OF GALENA, ILLINOIS.

IMPROVEMENT IN DISTILLATION OF OILS FROM RESIN.

Specification forming part of Letters Patent No. 28,663, dated June 12, 1860.

*To all whom it may concern:*

Be it known that I, SAMUEL FRAZER, of Galena, in the county of Jo Daviess and State of Illinois, have invented a process for separating the spirits and oils of rosin in the distillation of crude rosin; and I do hereby declare the following to be a full and exact description thereof.

The nature of my invention consists in producing five different and distinct products or articles of commerce in the shape of oils, designated by me as "No. 1," "No. 2," "No. 3," "No. 4," and "No. 5," all of which are obtained from the distillation of rosin by means of a peculiar process or *modus operandi* for that purpose.

To enable others skilled in the art to use my process and obtain said products, I will now proceed to describe my *modus operandi* in detail, for the better illustration of which I will refer to a given quantity of rosin.

Place, say four hundred (400) pounds crude rosin in boiler A and apply heat to the same. When melted and done rising, screw on the cover B and lute it with luting of salt and lime. The vapor then forming in the boiler passes through the tube K into the condenser E, thence in a liquid state into the receiver F, any vapor escaping into the receiver being carried off by the tube H, a fragment only of which is shown in the drawings. The stop-cock G remaining open the first liquid that passes off is the spirits of rosin, which is rough to the touch and gives no indication of the presence of oil. When about nine (9) quarts of the spirits have thus passed off oil will appear, when the stop-cock must be closed and the oil will be discharged through the siphon-tube H, the temperature of the oil as it leaves the siphon being 74° Fahrenheit. When three gallons of oil have passed off at this temperature it must be raised to 94° Fahrenheit, at which temperature four and a half (4½) gallons are to be drawn off. Then increase the temperature to 115° Fahrenheit, and draw off nine and a half (9½) gallons oil. Then increase again the temperature and draw off at 132° Fahrenheit thirteen and a half (13½) gallons oil. The temperature must now be reduced to 106° Fahrenheit, and six (6) gallons are drawn off. The oil thus separately drawn off at the several above temperatures are rosin-oils No. 1, No. 2, No. 3, No. 4, and No. 5, respectively, corresponding in their numbers to the succession of temperatures above given, which temperatures are obtained by some experience in the application of heat to the boiler. During the distillation a quantity of acidulated water is produced with the oil, which may be drawn off through the stop-cock. Any escaping into the vessel containing the oil readily separates from the oil and may be removed. The proportion of products to the amount of rosin hereinbefore given will hold good for any quantity used, and must be observed, as also the temperatures above indicated, in order to form, by proper proportions of combinations, the various products or oils.

I do not claim the process of obtaining oils from rosin, as patented by L. Robbins.

What I claim is—

The mode of obtaining oils from rosin by distillation, as set forth, by the distillation of rosin at the temperature and in the manner set forth.

SAMUEL FRAZER.

Witnesses:
 JOHN G. POTTS,
 J. C. H. HOBBS.